United States Patent
Gowda et al.

(10) Patent No.: US 11,650,334 B2
(45) Date of Patent: *May 16, 2023

(54) ACCELERATION OF REAL TIME COMPUTER VISION PROCESSING ON UAVS THROUGH GPS ATTITUDE ESTIMATION

(71) Applicant: International Business Machines Corporation, Armonk, NY (US)

(72) Inventors: Mahanth K. Gowda, Champaign, IL (US); Justin G. Manweiler, Somers, NY (US); Justin D. Weisz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 170 days.

This patent is subject to a terminal disclaimer.

(21) Appl. No.: 17/137,521

(22) Filed: Dec. 30, 2020

(65) Prior Publication Data

US 2021/0215833 A1    Jul. 15, 2021

Related U.S. Application Data

(63) Continuation of application No. 16/234,792, filed on Dec. 28, 2018, now Pat. No. 10,976,446, which is a
(Continued)

(51) Int. Cl.
*G01S 19/54* (2010.01)
*G01S 19/14* (2010.01)
(Continued)

(52) U.S. Cl.
CPC ............ *G01S 19/54* (2013.01); *G01S 19/14* (2013.01); *G01S 19/53* (2013.01); *G06T 7/70* (2017.01); *G01S 19/43* (2013.01)

(58) Field of Classification Search
CPC ............ G01S 19/54; G01S 19/14; G01S 19/43
See application file for complete search history.

(56) References Cited

U.S. PATENT DOCUMENTS 5,596,494 A    1/1997    Kuo
5,765,044 A    6/1998    Murai et al.
(Continued)

OTHER PUBLICATIONS

Consoli et al., "A multi-antenna approach for UAVs attitude determination", 2015 IEEE Metrology for Aerospace (MetroAeroSpace), Date of Conference: Jun. 4-5, 2015, Date Added to IEEE Xplore: Aug. 6, 2015, pp. 401-405.
(Continued)

*Primary Examiner* — Gregory C. Issing
(74) *Attorney, Agent, or Firm* — Scully, Scott, Murphy & Presser, PC (57) ABSTRACT

A method for applying GPS UAV attitude estimation to accelerate computer vision. The UAV has a plurality of GPS receivers mounted at fixed locations on the UAV. The method includes receiving GPS signals from each GPS satellite in view of the UAV, the GPS measurements comprising pseudo-range and carrier phase data representing the distance between each GPS receiver and each GPS satellite. Carrier phase and pseudo-range measurements are determined for each GPS receiver based on the pseudo-range and carrier phase data. The GPS carrier phase and pseudo-range measurements are compared pair-wise for each pair of GPS receiver and satellite. An attitude of the UAV is determined based on the relative distance measurements. A 3D camera pose rotation matrix is determined based on the attitude of the UAV. Computer vision image search computations are performed for analyzing the image data received from the UAV in real time using the 3D camera pose rotation matrix.

21 Claims, 6 Drawing Sheets

Related U.S. Application Data continuation of application No. 15/057,820, filed on Mar. 1, 2016, now Pat. No. 10,241,214.

(51) Int. Cl.
    *G06T 7/70*      (2017.01)
    *G01S 19/53*      (2010.01)
    *G01S 19/43*      (2010.01)

(56) References Cited

U.S. PATENT DOCUMENTS

| | | | |
|---|---|---|---|
| 6,593,879 | B1 | 7/2003 | Campbell |
| 8,948,446 | B2 | 2/2015 | Susca et al. |
| 9,031,809 | B1 | 5/2015 | Kumar et al. |
| 9,070,289 | B2 | 6/2015 | Saund et al. |
| 10,241,214 | B2 * | 3/2019 | Gowda ............... G01S 19/54 |
| 10,976,446 | B2 * | 4/2021 | Gowda ............... G01S 19/43 |
| 2007/0075896 | A1 | 4/2007 | Whitehead et al. |
| 2008/0144925 | A1 * | 6/2008 | Zhu ............... G06T 7/593 |
| | | | 382/154 |
| 2010/0033371 | A1 | 2/2010 | Kumagai et al. |
| 2011/0285590 | A1 | 11/2011 | Wellington |
| 2013/0004086 | A1 | 1/2013 | Carlbom et al. |
| 2015/0248584 | A1 | 9/2015 | Greveson et al. |

OTHER PUBLICATIONS

Dai, Zhen, "On GPS Based Attitude Determination", Dissertation, Von der Naturwissenschaftlich-Technischen Fakultät der Universität Siegen zur Erlangung des akademischen Grades, Feb. 2013, pp. 1-168.

Bristeau et al., "The Navigation and Control technology inside the A.R.Drone micro UAV", 18th IFAC World Congress, vol. 18., No. 1, Aug. 28-Sep. 2, 2011, pp. 1477-1484.

Meier et al., "Pixhawk: A Micro Aerial Vehicle Design for Autonomous Flight using Onboard Computer Vision", Autonomous Robots, 33.1-2 (2012): 21-39, Aug. 2012, First Online: Feb. 23, 2012; pp. 1-34.

Pinchin, "GNSS Based Attitude Determination for Small Unmanned Aerial Vehicles", Thesis University of Canterbury, Mar. 2011, pp. 1-220.

Wang et al., "Integration of GPS/INS/Vision Sensors to Navigate Unmanned Aerial Vehicles", The International Archives of the Photogrammetry, Remote Sensing and Spatial Information Sciences, vol. 37, Part B1, (2008), pp. 963-970.

Afrah et al., "Hive: A Distributed System for Vision Processing", Distributed Smart Cameras, 2008. ICDSC 2008, Second ACM/IEEE International Conference on IEEE, 2008, Conference Date: Sep. 7-11, 2008, pp. 1-9.

Canals et al., "A Biprocessor-Oriented Vision-Based Target Tracking System", Industrial Electronics, IEEE Transactions, vol. 49, No. 2 (Apr. 2002), pp. 500-506.

Lu, Gang, "Development of a GPS Multi-Antenna System for Attitude Determination", Dissertation at The University of Calgary, Dec. 1994, pp. 1-196.

List of IBM Patents or Patent Applications Treated as Related dated Dec. 30, 2020, pp. 2.

Campbell, Mark E. et al. "Vision-Based Geolocation Tracking System for Uninhabited Aerial Vehicles." Journal of Guidance, Control, and Dynamics, vol. 33, No. 2, Mar.-Apr. 2010. pp. 521-532 (Year: 2010).

\* cited by examiner

ACCELERATION OF REAL TIME COMPUTER VISION PROCESSING ON UAVS THROUGH GPS ATTITUDE ESTIMATION

BACKGROUND

This disclosure relates to computer vision on an unmanned autonomous vehicle (UAV) and more particularly to determining camera pose rotation based on the attitude of the UAV for computer vision.

There is much excitement and hype, surrounding technology for unmanned aerial vehicles (UAV), commonly known as UAVs. Despite ample progress, several substantial technical challenges yet remain before "ubiquitous UAVs" becomes a realistic vision of the future. One core, well-established challenge is in enabling UAVs to engage seamlessly with their environment. Addressing this challenge seems to demand ample computer vision, and in real time.

We are considering the need for computer vision on small flying UAVs/unmanned autonomous vehicles (UAVs). We believe computer vision will become increasingly essential for engaging with humans, for operating in unknown environments, for spotting targets to find or follow from a distance, for comprehending and responding to the visual or multispectral data they collect in real time, for collaborating with other UAVs or robots, and for finding means to recharge or refuel. Given these visual needs, capabilities for real time computer vision on UAV platforms seem like a must. Further, as these functions may often be safety critical, it may not be wise to offload to powerful back-end cloud compute systems. Much like a self-driving car, UAVs must also be mostly self-sufficient in their compute needs. However, unlike a self-driving car, the constraints in form factor, weight, and energy in the compute platform are highly constrained. Flying with a small low-power system on a chip (SoC) like the Raspberry Pi is quite feasible. However, a high performance server with GPUs is not currently realistic. Indeed, the resource constraints endemic to mobile computing on smartphones again apply to mobile computing on UAVs.

However, computer vision heuristics are often heavy weight, and difficult to run in a computing platform that can fit in the weight and form factor limitations of most UAVs. Several prior works consider means for precise relative GPS tracking; GPS applied to "attitude" (orientation) estimation, especially in the context of airplanes, satellites, and ships; and the use of GPS "position" in computer vision. However, these techniques are very time consuming and therefore are feasible for obtaining real time data.

SUMMARY

In one embodiment, a method for applying GPS UAV attitude estimation to accelerate computer vision is disclosed. The UAV has a plurality of GPS receivers mounted at fixed locations on the UAV. The method includes receiving GPS signals from each GPS satellite in view of the UAV, the GPS signals comprising pseudo-range and carrier phase data representing the distance between each GPS receiver fixed to the UAV and each GPS satellite in view of the UAV. Carrier phase and pseudo-range measurements are determined for each GPS receiver fixed to the UAV based on the obtained pseudo-range and carrier phase data. Te GPS carrier phase and pseudo-range measurements are compared pair-wise for each pair of GPS receiver and satellite. An attitude of the UAV is determined based on the relative distance measurements. A 3D camera pose rotation matrix is determined based on the attitude of the UAV. Image data from a camera mounted on the UAV is received and computer vision image search computations are performed for analyzing the image data received from the UAV in real time using the 3D camera pose rotation matrix.

In one embodiment, determining the carrier phase and pseudo-range measurements includes estimating an integral component of the distance between each GPS receiver and each GPS satellite using the pseudo-range data and estimating a fractional component of the distance between each GPS receiver and each GPS satellite using the carrier phase data. In one embodiment, comparing the GPS carrier phase and pseudo-range measurements includes comparing the pseudo-range and carrier phase estimated distance components pair-wise between the GPS receiver and satellite pairs. In a further embodiment, determining an attitude of the UAV includes calculating relative distances between the GPS receivers and each satellite based on the comparisons and determining the attitude of the UAV based on the relative distances between GPS receivers and satellites.

In another embodiment, determining a 3D camera pose rotation matrix includes determining a first attitude of the UAV at a first time point, determining a second attitude of the UAV at a second time point, encoding the first attitude of the UAV as a first 3×3 rotation matrix and encoding the second attitude of the UAV as a second 3×3 rotation matrix; and calculating a rotation of the camera between the first and second time points by multiplying first rotation matrix by the inverse of the second rotation matrix and encoding the results as the 3D camera pose rotation matrix.

A further embodiment includes locating coordinates of an image corresponding to the first and second time points in a first video or photograph stream time-synchronized to the raw GPS measurements, obtaining a camera matrix defining properties of the camera, combining the camera matrix and the 3D camera pose rotation matrix to determine predicted coordinates of the image in a second video or photograph stream time, projecting the predicted coordinates of the image into the second video or photograph stream time and using the projected coordinates as a starting point for a search in the second video or photograph stream for an image having the same physical characteristics of the image.

In one embodiment, a non-transitory article of manufacture tangibly embodying computer readable instructions, which when implemented, causes a computer to perform the steps of a method for applying GPS UAV attitude estimation to accelerate computer vision, the UAV having a plurality of GPS receivers mounted at fixed locations on the UAV. The steps include receiving raw GPS measurements from each GPS satellite in view of the UAV, the raw GPS measurements comprising pseudo-range and carrier phase data representing the distance between each GPS receiver fixed to the UAV and each GPS satellite in view of the UAV, determining carrier phase and pseudo-range measurements for each GPS receiver fixed to the UAV based on the obtained pseudo-range and carrier phase data, comparing the GPS carrier phase and pseudo-range measurements pair-wise for each pair of GPS receiver fixed to the UAV and GPS satellite in view of the UAV to determine relative distance measurements, determining an attitude of the UAV based on the relative distance measurements, determining a 3D camera pose rotation matrix based on the attitude of the UAV, receiving image data from a camera mounted on the UAV and performing computer vision image search computations for analyzing the image data received from the UAV in real time using the 3D camera pose rotation matrix.

In one embodiment, a computer system for applying GPS UAV attitude estimation to accelerate computer vision, the UAV having a plurality of GPS receivers mounted at fixed locations on the UAV, includes one or more computer processors, one or more non-transitory computer-readable storage media, and program instructions, stored on the one or more non-transitory computer-readable storage media, which when implemented by the one or more processors, causes the computer system to perform the steps of receiving raw GPS measurements from each GPS satellite in view of the UAV, the raw GPS measurements comprising pseudo-range and carrier phase data representing the distance between each GPS receiver fixed to the UAV and each GPS satellite in view of the UAV, determining carrier phase and pseudo-range measurements for each GPS receiver fixed to the UAV based on the obtained pseudo-range and carrier phase data, comparing the GPS carrier phase and pseudo-range measurements pair-wise for each pair of GPS receiver fixed to the UAV and GPS satellite in view of the UAV to determine relative distance measurements, determining an attitude of the UAV based on the relative distance measurements, determining a 3D camera pose rotation matrix based on the attitude of the UAV, receiving image data from a camera mounted on the UAV and performing computer vision image search computations for analyzing the image data received from the UAV in real time using the 3D camera pose rotation matrix.

BRIEF DESCRIPTION OF THE DRAWINGS

These and other features and advantages of the present invention will become apparent from the following detailed description of illustrative embodiments thereof, which is to be read in connection with the accompanying drawings, in which.

DETAILED DESCRIPTION OF PREFERRED EMBODIMENTS

This disclosure is directed to shortcuts to computer vision, based on precision motion sensing. In particular, the disclosure is directed to the use of multiple GPS receivers to estimate UAV 3D orientation, more precisely than is possible through inertial sensing. In one embodiment applied to computer vision, an order of magnitude reduction in the search space of spatial computer vision heuristics is achieved.

In one embodiment, GPS attitude estimation is applied to accelerate computer vision. While the disclosure has applications to UAVs, broader use cases would also apply, for example, automotive applications (e.g., self-driving cars).

In one embodiment, precise sensory assistance for computer vision can eliminate computer vision variables. Substituting known terms for the unknown can reduce the search space an order of magnitude. Specifically, a primary unknown in several key computer vision heuristics is often the relative camera pose across two or more successive images. Spatial heuristics such as structure from motion (SfM) requires spatially linking these images. For example, the system must deduce several key-points in image A that correspond to the same points in physical space found in image B. If it is known that images A and B were actually taken from a fixed point P with a known rotation angle APB in between, the problem immediately becomes far easier because the system can re-project A based on the angle APB. Key points in B are likely to appear nearby the re-projected points from A. Importantly, they will not appear precisely at the re-projected point, due to the 3D structure captured in A and B. However, image changes strictly due to camera pose are eliminated and the search space is commensurately reduced.

From the above example, it should be clear that computer vision computations can be accelerated through sensory inputs. Thus, the question becomes how to estimate the relative camera pose across a series of images. Of course, UAVs can and do feature a gamut of spatial and inertial sensors: GPS, compass, barometer, accelerometer, and gyroscope. While these can be applied, high precision id needed. If sensory estimates contain too much error, the efficacy of computer vision heuristics will be intolerably degraded.

Camera pose can be decomposed into two parts: position and orientation. For relative pose (the delta between two images from the same camera), these become rotation (e.g., APB) and translation—how much the camera has rotated and moved. In the context of UAVs, which generally fly in open outdoor spaces, GPS presents an obvious opportunity to estimate translation well. Differential GPS (DGPS) has been applied to estimate relative motion at centimeter scale (i.e., using a secondary fixed GPS on the ground to compensate for transmission delays in the ionosphere). Further, given that subjects in view of a UAV are likely far away, a few centimeters of error would translate to very little difference in the resultant image. Thus, at great distance, computer vision is translation insensitive, and DGPS is well suited for translation estimation. However, at all scales, computer vision is certainly rotation sensitive.

However, in the context of UAVs, accurate rotation measurement becomes difficult. Due to their small, high torque DC motors, UAVs can change direction rapidly. Compared to aviation, the nature of quad-copter flight may be aggressive in ways that would make humans ill. Accelerometers and gyroscopes are also subject to these inertial forces, and may track relative rotational positions poorly under angular acceleration. For applications to computer vision, absolute measurements are more promising than inertial dead reckoning.

Absolute rotational tracking requires a well known point of reference. One possibility is through computer vision—tracking the ground—as naturally occurs when structure from motion is applied on UAV imagery. However, there are advantages to reducing the quantity of computer vision computation. Possible approaches, such as structure from motion, are themselves complex: using computer vision to speed itself does not seem promising.

In certain contexts, GPS has been applied to estimate absolute orientation—or "attitude" in aeronautical terms. In spacecraft, on airplanes, and on ships, GPS receivers can be spread far apart at known distances. Relative distances between each receiver and GPS satellites can be applied to infer angular position. Especially, more complex GPS calculations based on the carrier phase measurement can make these relative measurements extremely precise.

Figure 1:
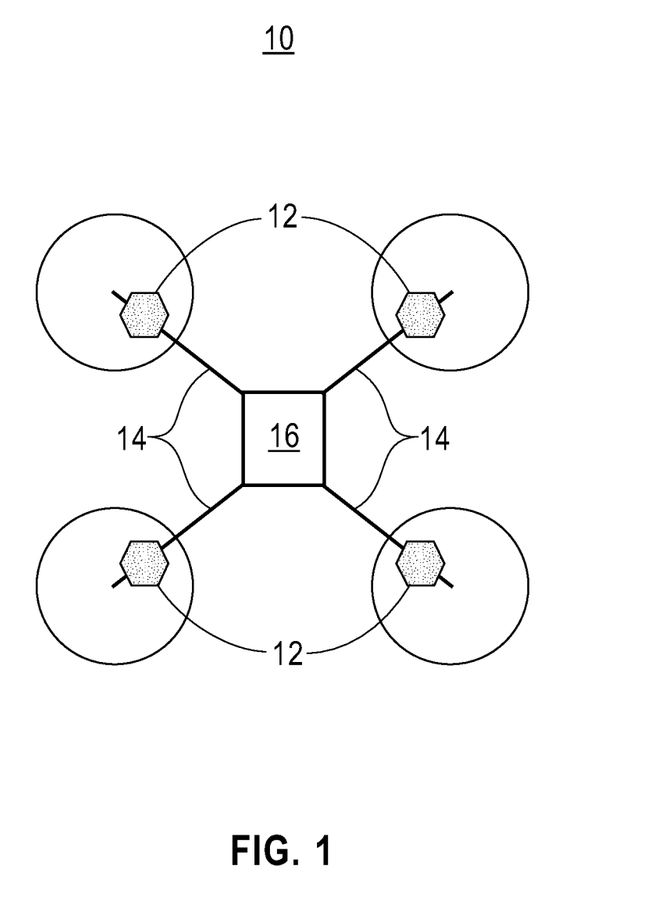
FIG. 1 is a schematic of a UAV having a series of GPS receivers mounted to the arms of the UAV.

As shown in FIG. 1, several GPS receivers, are mounted to a UAV or other vehicle 10. In the exemplary embodiment in FIG. 1, four receivers 12 are mounted to four UAV arms 14, each connected to UAV body 16. GPS receivers 12 are physically mounted to the arms 14 of the UAV craft 10. The distances between GPS receivers 12 are precisely measured. In one embodiment, the receivers 12 are positioned to maximize the distance between the receivers, which increases the length of computational baselines, and ultimately enhancing attitude estimation accuracy. In the embodiment shown in FIG. 1, the receiver-to-receiver distances are 26 cm distance on short side of UAV craft 10, and 38 cm distance on the long side of UAV craft 10. In one embodiment, the GPS receivers 12 are mounted on same plane for measurement accuracy. In this disclosure, a GPS receiver can be a GPS antenna or a full receiver.

Figure 2:
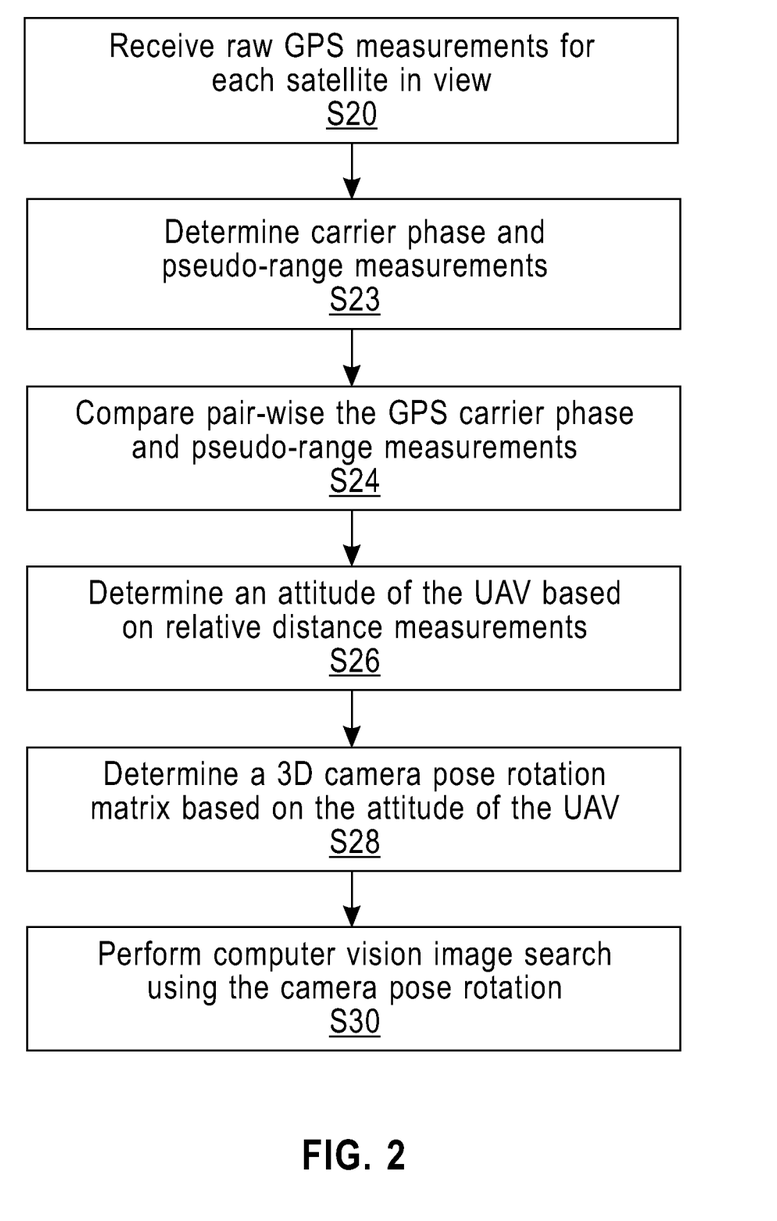
FIG. 2 is a flow chart of one embodiment of the method applying GPS UAV attitude estimation to accelerate computer vision.

FIG. 2 shows one embodiment of the method for applying GPS attitude estimation to accelerate computer vision. In step S20 the receivers receive raw GPS measurements for each satellite in view. In step S23 the system determines carrier phase and pseudo-range measurements. In step S24 the system compares pair-wise the GPS carrier phase and pseudo-range measurements. In step S26 the system determines an attitude of the UAV based on relative distance measurements. In step S28 the system determines a 3D camera pose rotation matrix based on the attitude of the UAV. In step S30 the system performs computer vision image search using the camera pose rotation.

In step S20, the GPS hardware devices provide the raw data representing the distance between the receiver and satellite. Each are provided from the GPS hardware by USB, serial, wireless RF or other communication mechanism to a computer. These distances are composed of two parts, an integral component—estimated as a pseudo-range distance—and a fractional part—estimated by the carrier phase. The phase is a fractional value [0, 1) of a wavelength.

In step S23 GPS carrier phase measurements at each GPS receiver are obtained by multiplying the fractional phase by the wavelength length (e.g., in meters), to obtain a distance as a fraction of a wavelength. Combining the integral and fractional components results in a precise distance between receiver and satellite. The availability of the fractional component gives very high accuracy with granularity in the order of centimeters while granularity of pseudo-ranges is in the order of 30 cm (i.e., one wavelength at GPS RF frequencies).

These measurements are determined for every GPS receiver 12, for every satellite. From all measurements taken together, a precise geometry of how the receivers, in fixed relative positions on the UAV 10, relate to the reference GPS satellites is obtained. However, these measurements will have substantial error—and cannot be directly used. Instead, a comparison of the distance measurements pair-wise between receivers and satellites is made. The results is relative pseudo-ranges and relative carrier phases. Differences among carrier phase will be highly precise—especially, as several sources of GPS error will cancel in the comparison (e.g., correlated clock errors). These relative measurements provide a geometry of the relative positions of the GPS receivers—this relative geometry is the UAV attitude—Yaw, Pitch, and Roll.

Figure 3:
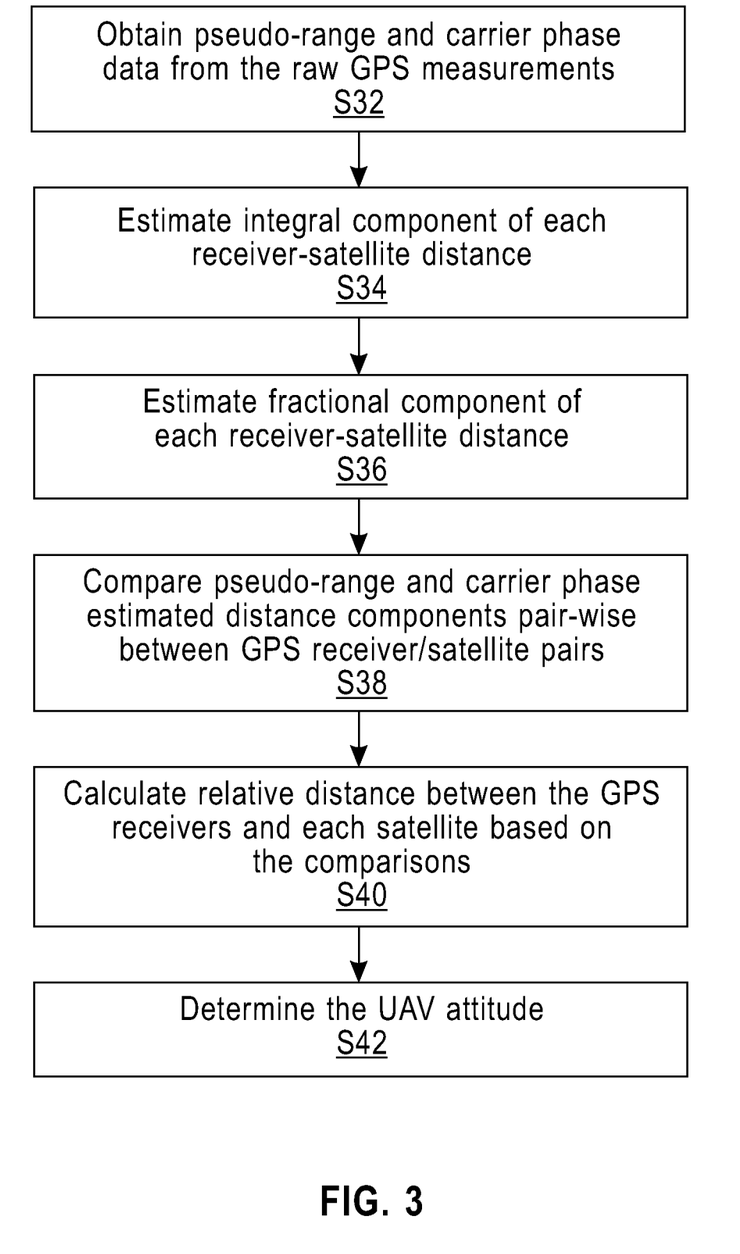
FIG. 3 is a flow chart of one embodiment of the method for determining carrier phase and pseudo-range measurements and determining the attitude of the UA.

FIG. 3 is a flow diagram of one embodiment of the steps for comparing GPS carrier phase measurements at each GPS receiver to obtain a precise geometry of the GPS receivers fixed to the UAV relative to several GPS satellites. In step S32 the system obtains pseudo-range and carrier phase data from the raw GPS measurements. In step S34 the system estimates integral component of each receiver-satellite distance. In step S36 the system estimates the fractional component of each receiver-satellite distance. In step S38 the system compares pseudo-range and carrier phase estimated distance components pair-wise between GPS receiver/satellite pairs. In step S40 the system calculates relative distances between the GPS receivers and each satellite based on the comparisons. In step S42 the system determines the UAV attitude. In this process, error sources such a from the receiver and satellite clocks are canceled in the relative distance calculation. In one embodiment, across samples over time, statistical techniques may be applied to reduce noise in the calculation, such as Kalman Filtering.

In step S28, the "attitude" output of step S26 is used as a known "camera pose" for any video/still cameras mounted to the vehicle. Across multiple video frames, or multiple still images, each pose estimate from step S28 provides a precise measure of rotation. The output of step S30 is a list of sequential images from the camera with the inter-frame rotation between each. It should be noted that the rotation is in three dimensions (3D), capturing each of yaw (a change in compass direction), pitch (nose moving up and down) and roll (rotation along the axis of the vehicular body).

Each attitude measurement may be represented as a 3×3 matrix of rotation. Consider two attitude matrices, A and B. Also consider that a rotation R (another rotation matrix) occurs between A and B such that R*A=B. Thus, R=B*A^−1. In other words, R=B right-multiplied by A-inverse.

Figure 4:
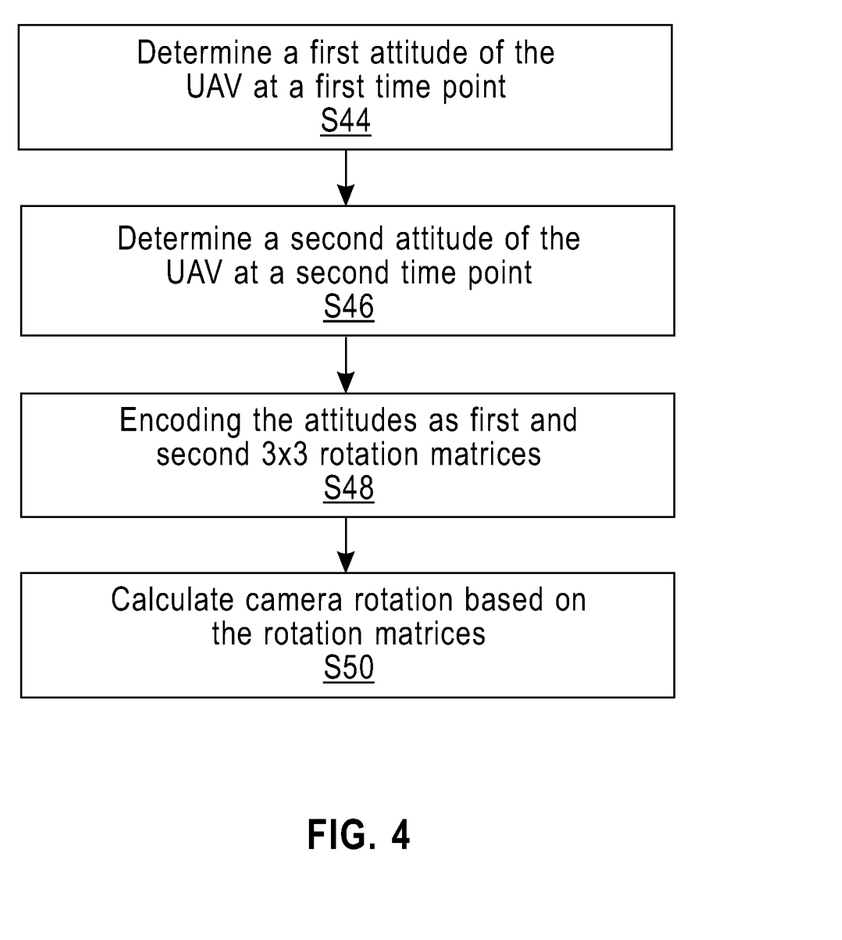
FIG. 4 is a flow chart of one embodiment of determining a 3D camera pose rotation matrix.

FIG. 4 is a flow diagram of the method for use the GPS attitude geometry to produce a 3D camera pose rotation matrix of step S28. In steps S44 and S46 the UAV attitude for two time points are obtained from step S42. In step S48, each attitude from step steps S44 and Step S46 is encoded as a 3×3 rotation matrix, for the two time points, matrices A and B. In step S50, the camera rotation R from A to B is solved as R=B*A^−1, that is A is right-matrix-multiplied by the inverse of A. By properties of rotation matrices, A-inverse may be computed simply as A-transpose. In step S50, the rotation R, may optionally be modified for use in computer vision. For example, R may be converted to any other representation of 3D rotation, such as Quaternions/Versors, by standard formula.

The camera pose/inter-frame rotation is used as input to fundamental computer vision heuristics. By reducing the computer vision search space, the computational complexity is reduced substantially. Computer vision heuristic applications include but are not limited to: (1) keypoint detection; (2) keypoint matching; (3) structure from motion; (4) motion tracking, such as optical flow; and (4) blob detection and tracking.

In one embodiment the camera pose is used for visual feature matching. In this scenario a 2D point in an image must be matched to another 2D point in a second image, such that the two 2D points represent the same real point in 3D space. Such points may be tracked by features, such as those output by the often-used SIFT feature detector and descriptor. Known rotation can be used to "predict" the location of the feature in the second image from the first, whereas the rotation corresponds to a visual re-projection of the original image. Any feature detected in the first image may be searched for in the second image, using the re-projected coordinate as an origin of the search. Instead of searching arbitrarily throughout the second image, we may first look at the predicted location, expanding the search boundary from there (e.g., in concentric circles or progressively-larger bounding boxes). In this way, the search should complete substantially faster than arbitrary matching, where the feature might appear anywhere in the second image. It will also be faster than searching from the same 2D location in the second location as it appears in the first, and rotation might substantially move the correct location in the frame.

Figure 5:
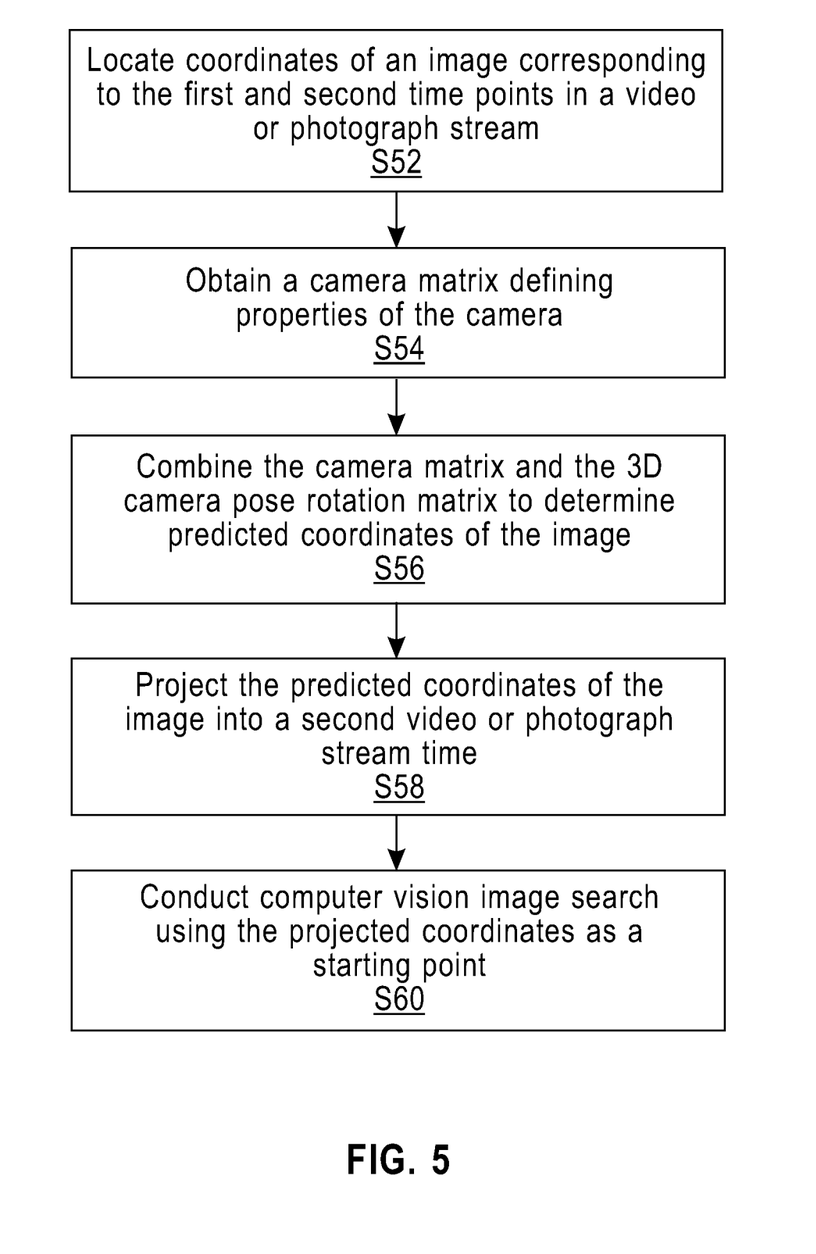
FIG. 5 is a flow chart of using the camera pose rotation matrix to accelerate computer vision.

FIG. 5 is a flow diagram of one embodiment of the method of using the 3D camera pose rotation matrix in computer vision.

In step S28, rotation between two time points is inferred and a 3D rotation matrix for the two points is determined. In step S52, in a video/photograph stream time-synchronized to GPS measurements, an image corresponding to each of the two time points is found. The process might also be reversed to find GPS measurements corresponding to the time of two desired images. In step S54, from a database or a set of calibration images, the fundamental matrix of the camera is obtained, which includes a description of the properties of the lens, such as field of view and distortional coefficients. Step S56 is combining the fundamental matrix and the matrix of rotation, and the coordinates of original image are re-projected into their predicted location in the next image in step S58. In step S60, the re-projected coordinate is used as a starting point for a search in the second image for the same physical characteristic present in the first image. The search bounds may be systematically expanded around the predicted coordinate. Several search expansion heuristics are reasonable, such as concentric circles or progressively-larger bounding boxes. The appropriate choice is dependent on the computational and memory characteristics of the computer system on which the search will be run. Due to several factors, such as translation—horizontal or vertical non-rotation movement of the UAV craft—and effects of 3D parallax, the re-projection will be imprecise, but will provide a better starting point than arbitrarily selecting a point. In an optional step, the matching process can be automated through the use of computer vision visual features, such as those from the SIFT descriptor. Many other visual feature detector/extractors also apply, such as SURF, AKAZE, ORB and BRIEF.

Figure 6:
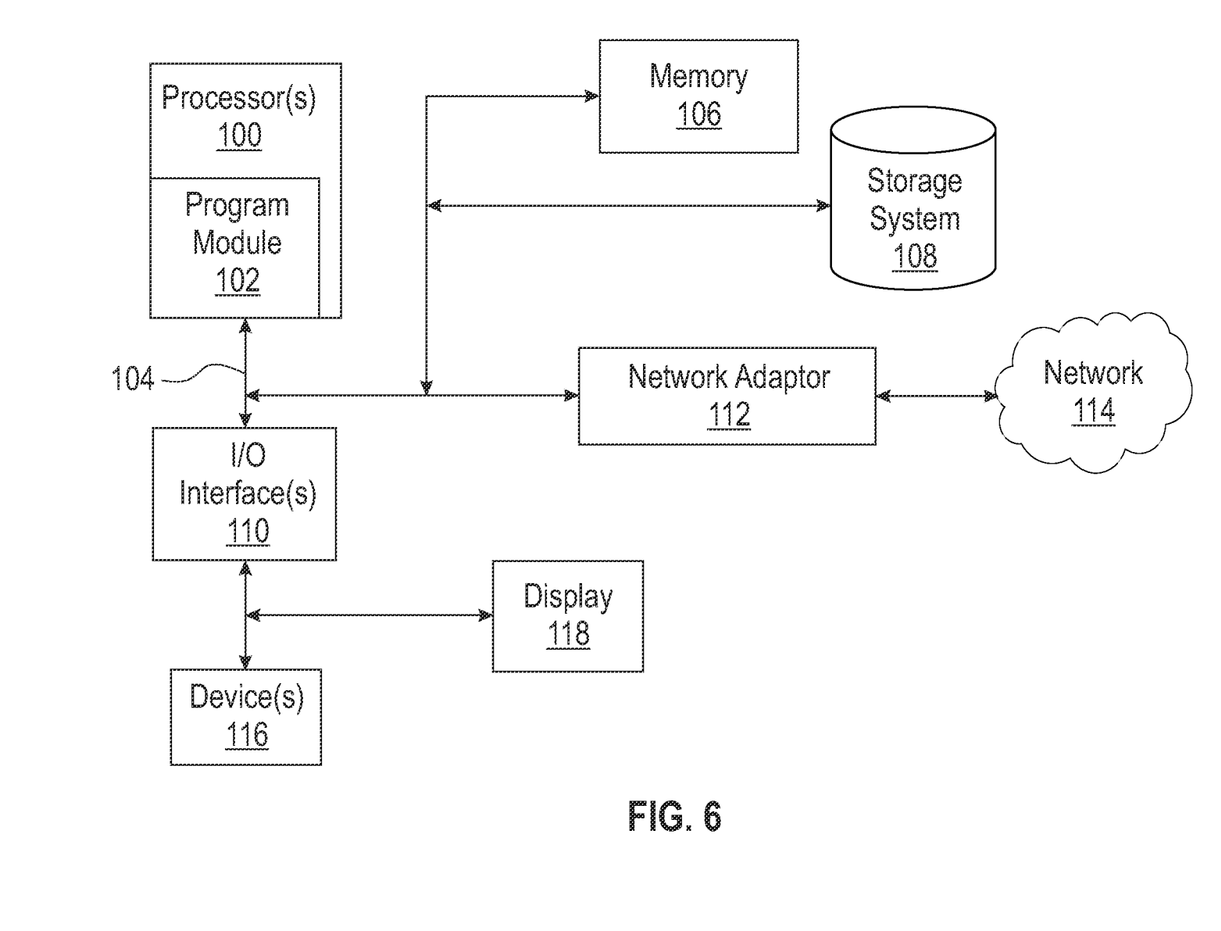
FIG. 6 is a block diagram of an exemplary computing system suitable for implementation of this invention.

FIG. 6 illustrates a schematic of an example computer or processing system that may implement the method for applying GPS UAV attitude estimation to accelerate computer vision in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A method for identifying a search space for an object in images generated from a camera on a UAV having a plurality of GPS receivers, the method comprising:
   obtaining measurements representing distances between each GPS receiver fixed to the UAV and each GPS satellite in view of the UAV;
   comparing the measurements pair-wise for each pair of GPS receivers fixed to the UAV and GPS satellite in view of the UAV to determine relative distance measurements;
   determining an attitude of the UAV based on the relative distance measurements at each of a plurality of time points;
   encoding the attitude of the UAV at a first time point and a second time point as first and second 3D rotation matrices, respectively;
   calculating a camera pose rotation between the first time point and the second time point using the first and second 3D camera pose rotation matrices;
   receiving first image data containing an object from a camera mounted on the UAV taken at the first time point and receiving second image data from the camera mounted on the UAV taken at the second time point; and
   analyzing the first and second image data received from the UAV at the first and second time points, respectively, and projecting the first image data onto the second image data using the calculated camera pose rotation to identify a search space for the object in the second image data based on the image projection.

2. The method of claim 1, further comprising receiving GPS signals from each GPS satellite in view of the UAV, the GPS signals comprising respective pn codes and carrier frequencies; obtaining carrier phase and pseudo-range measurements for each GPS receiver fixed to the UAV based on the respective pn codes and carrier frequencies, the pseudo-range and carrier phase data measurements representing the distance between each GPS receiver fixed to the UAV and each GPS satellite in view of the UAV; and comparing the GPS carrier phase and pseudo-range measurements pair-wise for each pair of GPS receivers fixed to the UAV and GPS satellite in view of the UAV to determine relative distance measurements.

3. The method of claim 1, wherein determining the 3D camera pose rotation matrix based on the attitude of the UAV comprises the steps of:
   determining a first attitude of the UAV at a first time point;
   determining a second attitude of the UAV at a second time point;
   encoding the first attitude of the UAV as a first 3×3 rotation matrix and encoding the second attitude of the UAV as a second 3×3 rotation matrix; and
   calculating a rotation of the camera between the first and second time points by multiplying the first rotation matrix by the inverse of the second rotation matrix and encoding the results as the 3D camera pose rotation matrix.

4. The method of claim 2, wherein determining the carrier phase and pseudo-range measurements comprises estimating an integral component of the distance between each GPS receiver and each GPS satellite using the pseudo-range data and estimating a fractional component of the distance between each GPS receiver and each GPS satellite using the carrier phase data.

5. The method of claim 4 wherein comparing the GPS carrier phase and pseudo-range measurements comprises comparing the pseudo-range and carrier phase estimated distance components pair-wise between the GPS receiver and satellite pairs.

6. The method of claim 5, wherein determining an attitude of the UAV comprises calculating relative distances between the GPS receivers and each satellite based on the comparisons and determining the attitude of the UAV based on the relative distances between GPS receivers and satellites.

7. The method of claim 1, further comprising:
   predicting coordinates of the object in the image data at the second time point based on the estimated camera pose rotation;
   locating coordinates of an image corresponding to the first and second time points in a first video or photograph stream time-synchronized to the GPS signals;
   obtaining a camera matrix defining properties of the camera;
   combining the camera matrix and the 3D camera pose rotation matrix to determine predicted coordinates of the image in a second video or photograph stream time;
   projecting the predicted coordinates of the image into the second video or photograph stream time; and
   using the projected coordinates as a starting point for a search in the second video or photograph stream for an image having the same physical characteristics of the image.

8. A non-transitory article of manufacture tangibly embodying computer readable instructions, which when implemented, cause a computer to perform the steps of a method for identifying a search space for an object in images generated from a camera on a UAV having a plurality of GPS receivers, comprising;
   obtaining measurements representing distances between each GPS receiver fixed to the UAV and each GPS satellite in view of the UAV;
   comparing the measurements pair-wise for each pair of GPS receivers fixed to the UAV and GPS satellite in view of the UAV to determine relative distance measurements;

determining an attitude of the UAV based on the relative distance measurements at each of a plurality of time points;

encoding the attitude of the UAV at a first time point and a second time point as first and second 3D rotation matrices, respectively;

calculating a camera pose rotation between the first time point and the second time point using the first and second 3D camera pose rotation matrices;

receiving first image data containing an object from a camera mounted on the UAV taken at the first time point and receiving second image data from the camera mounted on the UAV taken at the second time point; and analyzing the first and second image data received from the UAV at the first and second time points, respectively, and projecting the first image data onto the second image data using the calculated camera pose rotation to identify a search space for the object in the second image data based on the image projection.

9. The non-transitory article of manufacture of claim 8, further comprising receiving GPS signals from each GPS satellite in view of the UAV, the GPS signals comprising respective pn codes and carrier frequencies; obtaining carrier phase and pseudo-range measurements for each GPS receiver fixed to the UAV based on the respective pn codes and carrier frequencies, the pseudo-range and carrier phase data measurements representing the distance between each GPS receiver fixed to the UAV and each GPS satellite in view of the UAV; and comparing the GPS carrier phase and pseudo-range measurements pair-wise for each pair of GPS receivers fixed to the UAV and GPS satellite in view of the UAV to determine relative distance measurements.

10. The non-transitory article of manufacture of claim 8, wherein determining the 3D camera pose rotation matrix based on the attitude of the UAV comprises the steps of:
determining a first attitude of the UAV at a first time point;
determining a second attitude of the UAV at a second time point;
encoding the first attitude of the UAV as a first 3×3 rotation matrix and encoding the second attitude of the UAV as a second 3×3 rotation matrix; and
calculating a rotation of the camera between the first and second time points by multiplying the first rotation matrix by the inverse of the second rotation matrix and encoding the results as the 3D camera pose rotation matrix.

11. The non-transitory article of manufacture of claim 9, wherein determining the carrier phase and pseudo-range measurements comprises estimating an integral component of the distance between each GPS receiver and each GPS satellite using the pseudo-range data and estimating a fractional component of the distance between each GPS receiver and each GPS satellite using the carrier phase data.

12. The non-transitory article of manufacture of claim 11, wherein comparing the GPS carrier phase and pseudo-range measurements comprises comparing the pseudo-range and carrier phase estimated distance components pair-wise between the GPS receiver and satellite airs.

13. The non-transitory article of manufacture of claim 12, wherein determining an attitude of the UAV comprises calculating relative distances between the GPS receivers and each satellite based on the comparisons and determining the attitude of the UAV based on the relative distances between GPS receivers and satellites.

14. The non-transitory article of manufacture of claim 13, further comprising:

predicting coordinates of the object in the image data at the second time point based on the estimated camera pose rotation;

locating coordinates of an image corresponding to the first and second time points in a first video or photograph stream time-synchronized to the GPS signals;

obtaining a camera matrix defining properties of the camera;

combining the camera matrix and the 3D camera pose rotation matrix to determine predicted coordinates of the image in a second video or photograph stream time;

projecting the predicted coordinates of the image into the second video or photograph stream time; and using the projected coordinates as a starting point for a search in the second video or photograph stream for an image having the same physical characteristics of the image.

15. A computer system for identifying a search space for an object in images generated from a camera on a UAV having a plurality of GPS receivers comprising:
one or more computer processors;
one or more non-transitory computer-readable storage media;
program instructions, stored on the one or more non-transitory computer-readable storage media, which when implemented by the one or more processors, cause the computer system to perform the steps of:
obtaining measurements representing distances between each GPS receiver fixed to the UAV and each GPS satellite in view of the UAV;
comparing the measurements pair-wise for each pair of GPS receivers fixed to the UAV and GPS satellite in view of the UAV to determine relative distance measurements;
determining an attitude of the UAV based on the relative distance measurements at each of a plurality of time points;
encoding the attitude of the UAV at a first time point and a second time point as first and second 3D rotation matrices, respectively;
calculating a camera pose rotation between the first time point and the second time point using the first and second 3D camera pose rotation matrices;
receiving first image data containing an object from a camera mounted on the UAV taken at the first time point and receiving second image data from the camera mounted on the UAV taken at the second time point; and
analyzing the first and second image data received from the UAV at the first and second time points, respectively, and projecting the first image data onto the second image data using the calculated camera pose rotation to identify a search space for the object in the second image data based on the image projection.

16. The computer system of claim 15, further comprising receiving GPS signals from each GPS satellite in view of the UAV, the GPS signals comprising respective pn codes and carrier frequencies; obtaining carrier phase and pseudo-range measurements for each GPS receiver fixed to the UAV based on the respective pn codes and carrier frequencies, the pseudo-range and carrier phase data measurements representing the distance between each GPS receiver fixed to the UAV and each GPS satellite in view of the UAV; and comparing the GPS carrier phase and pseudo-range measurements pair-wise for each pair of GPS receivers fixed to the UAV and GPS satellite in view of the UAV to determine relative distance measurements.

17. The computer system of claim 15, wherein determining the 3D camera pose rotation matrix based on the attitude of the UAV comprises the steps of:
  determining a first attitude of the UAV at a first time point;
  determining a second attitude of the UAV at a second time point;
  encoding the first attitude of the UAV as a first 3×3 rotation matrix and encoding the second attitude of the UAV as a second 3×3 rotation matrix; and
  calculating a rotation of the camera between the first and second time points by multiplying the first rotation matrix by the inverse of the second rotation matrix and encoding the results as the 3D camera pose rotation matrix.

18. The computer system of claim 16, wherein determining the carrier phase and pseudo-range measurements comprises estimating an integral component of the distance between each GPS receiver and each GPS satellite using the pseudo-range data and estimating a fractional component of the distance between each GPS receiver and each GPS satellite using the carrier phase data.

19. The computer system of claim 18, wherein comparing the GPS carrier phase and pseudo-range measurements comprises comparing the pseudo-range and carrier phase estimated distance components pair-wise between the GPS receiver and satellite pairs.

20. The computer system of claim 19, wherein determining an attitude of the UAV comprises calculating relative distances between the GPS receivers and each satellite based on the comparisons and determining the attitude of the UAV based on the relative distances between GPS receivers and satellites.

21. The computer system of claim 15, further comprising:
  predicting coordinates of the object in the image data at the second time point based on the estimated camera pose rotation;
  locating coordinates of an image corresponding to the first and second time points in a first video or photograph stream time-synchronized to the GPS signals;
  obtaining a camera matrix defining properties of the camera;
  combining the camera matrix and the 3D camera pose rotation matrix to determine predicted coordinates of the image in a second video or photograph stream;
  projecting the predicted coordinates of the image into the second video or photograph stream time; and
  using the projected coordinates as a starting point for a search in the second video or photograph stream for an image having the same physical characteristics of the image.

* * * * *